(12) United States Patent
Schuler et al.

(10) Patent No.: US 12,211,054 B2
(45) Date of Patent: Jan. 28, 2025

(54) SYSTEM AND METHOD TO SUPPORT HUMAN-MACHINE INTERACTIONS FOR PUBLIC SAFETY ANNOTATIONS

(71) Applicant: MOTOROLA SOLUTIONS, INC., Chicago, IL (US)

(72) Inventors: Francesca Schuler, Palatine, IL (US); Christine K Rapala, West Dundee, IL (US); Trent J Miller, West Chicago, IL (US); Larry D Freeman, Valparaiso, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 478 days.

(21) Appl. No.: 17/448,366

(22) Filed: Sep. 22, 2021

(65) Prior Publication Data

US 2023/0088315 A1    Mar. 23, 2023

(51) Int. Cl.
| | |
|---|---|
| G06Q 30/018 | (2023.01) |
| G06F 40/169 | (2020.01) |
| G06N 5/043 | (2023.01) |
| G06Q 10/105 | (2023.01) |
| G06Q 50/18 | (2012.01) |
| G06Q 50/26 | (2024.01) |
| H04N 7/18 | (2006.01) |

(52) U.S. Cl.
CPC ......... *G06Q 30/018* (2013.01); *G06F 40/169* (2020.01); *G06N 5/043* (2013.01); *G06Q 10/105* (2013.01); *H04N 7/181* (2013.01); *G06Q 50/182* (2013.01); *G06Q 50/26* (2013.01); *G06Q 2230/00* (2013.01)

(58) Field of Classification Search
CPC ............... G06Q 30/118; G06Q 10/105; G06Q 2230/00; G06F 40/169; G06N 5/043
See application file for complete search history.

(56) References Cited

U.S. PATENT DOCUMENTS

| | | | |
|---|---|---|---|
| 6,938,029 B1 * | 8/2005 | Tien ........................ | G06F 16/41 348/157 |
| 7,966,602 B1 * | 6/2011 | Webster .................. | G06F 8/423 717/114 |
| 8,826,117 B1 * | 9/2014 | Junee .................... | G11B 27/034 715/230 |
| 8,837,906 B2 * | 9/2014 | May .................... | G06F 16/7867 348/288 |
| 9,336,675 B2 * | 5/2016 | Miller .................... | H04L 41/06 |
| 9,767,087 B1 * | 9/2017 | Petrov .................... | H04N 21/84 |
| 9,860,308 B2 * | 1/2018 | Berajawala .......... | G06Q 10/101 |
| 10,061,482 B1 * | 8/2018 | Bingham ............... | G11B 27/00 |
| 10,146,757 B2 | 12/2018 | Lieu | |
| 10,635,906 B1 * | 4/2020 | Gan ........................ | G11B 27/28 |
| 10,733,450 B1 * | 8/2020 | Goldenberg ........... | G06V 20/41 |
| 11,343,470 B1 * | 5/2022 | Cronan ............... | G06F 3/04842 |
| 2002/0112201 A1 * | 8/2002 | Flanagan ............. | G06F 11/3608 714/38.1 |

(Continued)

*Primary Examiner* — Anne L Thomas-Homescu

(57) ABSTRACT

Techniques to support human-machine interactions for public safety annotations are provided. Live streamed media that includes at least one of audio and video is received. The live streamed media is replicated. The replicated live streamed media is sent to at least two of an artificial intelligence bot and a human for annotation. A conflict between the annotations is detected. The conflict is resolved via an agency selected annotation conflict resolution policy.

21 Claims, 10 Drawing Sheets

(56) References Cited

U.S. PATENT DOCUMENTS

| | | | | |
|---|---|---|---|---|
| 2005/0028144 | A1* | 2/2005 | Bergman | G06F 8/36 717/111 |
| 2005/0086703 | A1* | 4/2005 | Gupta | H04N 21/23418 348/E7.071 |
| 2005/0160355 | A1* | 7/2005 | Cragun | G06F 40/169 715/230 |
| 2005/0160356 | A1* | 7/2005 | Albornoz | G06F 40/197 715/229 |
| 2005/0268281 | A1* | 12/2005 | Letkeman | G06F 40/169 717/120 |
| 2010/0023319 | A1* | 1/2010 | Bikel | G06F 40/169 704/9 |
| 2010/0042410 | A1* | 2/2010 | Stephens, Jr. | G10L 13/08 704/260 |
| 2011/0040644 | A1* | 2/2011 | Juda | G06Q 30/0275 705/34 |
| 2011/0246471 | A1* | 10/2011 | Rakib | G11B 27/28 707/769 |
| 2012/0315009 | A1* | 12/2012 | Evans | H04N 21/4828 386/230 |
| 2013/0145269 | A1* | 6/2013 | Latulipe | G06F 3/048 715/720 |
| 2013/0334300 | A1* | 12/2013 | Evans | H04N 21/47217 235/494 |
| 2014/0082473 | A1* | 3/2014 | Sitrick | G06F 17/00 715/255 |
| 2014/0359421 | A1* | 12/2014 | Allen | G06F 40/169 715/230 |
| 2015/0010289 | A1* | 1/2015 | Lindblom | G11B 27/30 386/241 |
| 2015/0046537 | A1* | 2/2015 | Rakib | G11B 27/34 709/204 |
| 2015/0095822 | A1* | 4/2015 | Feis | G06F 3/04842 715/765 |
| 2015/0170040 | A1* | 6/2015 | Berdugo | G06F 16/907 706/11 |
| 2016/0162464 | A1* | 6/2016 | Munro | G06F 40/30 704/9 |
| 2016/0247535 | A1* | 8/2016 | Latulipe | H04N 21/4788 |
| 2016/0365121 | A1* | 12/2016 | DeCaprio | H04N 9/8205 |
| 2017/0012993 | A1* | 1/2017 | Lieu | G06F 40/117 |
| 2018/0176474 | A1* | 6/2018 | Blanco | G06F 40/169 |
| 2018/0357439 | A1* | 12/2018 | Osotio | G06F 21/6218 |
| 2018/0373980 | A1* | 12/2018 | Huval | G06F 18/41 |
| 2019/0147402 | A1* | 5/2019 | Sitrick | H04L 12/1822 705/301 |
| 2020/0019599 | A1* | 1/2020 | Lynch | G06F 40/169 |
| 2020/0064322 | A1 | 2/2020 | Park et al. | |
| 2020/0175106 | A1* | 6/2020 | Biddle | G06F 40/279 |
| 2020/0342165 | A1* | 10/2020 | Butkovic | G06F 40/30 |
| 2021/0019360 | A1* | 1/2021 | Li | G06F 40/169 |
| 2021/0042291 | A1* | 2/2021 | Banipal | G06N 5/02 |
| 2021/0141997 | A1* | 5/2021 | Pinnamaneni | G06F 3/04847 |
| 2022/0174367 | A1* | 6/2022 | Dorn | G06F 3/0482 |

* cited by examiner

SYSTEM AND METHOD TO SUPPORT HUMAN-MACHINE INTERACTIONS FOR PUBLIC SAFETY ANNOTATIONS

BACKGROUND

In today's public safety environment, multimedia information, such as video and audio, is ever increasing. Security cameras have become ubiquitous. A large majority of people carry at least one device that allows for recording of video and/or audio (e.g. smartphone, etc.). It is desirable to store such files in a way that is conveniently searchable. In order to do so, the multimedia files may be annotated. For example, a segment of a video file including a blue car that crashed into a red car may be annotated with the phrase, "Blue car collides with red Car." The annotations may be even more complex depending on what is visible in the scene. For example, if license plate numbers are visible, the annotations may include such information.

In earlier times, annotations may have been performed by one or more human operators. The human would view the video and/or audio multimedia, and would manually annotate the multimedia. Automatic annotation was then introduced in which an artificial intelligence bot, using machine learning or other techniques, could review the multimedia file and automatically provide annotations. Such annotations may also be referred to as automatic video descriptive services. The automatic annotation systems may, in some cases, be provided as a third party service (e.g. not directly under the control of a public safety agency).

The agency may send multimedia files to such a service, and receive annotated versions of the multimedia files in return. The public safety agency may have little to no control over the process used by the third party system in order to produce the annotations. Similarly, in some cases, human annotation could also be provided by a third party service, over which the public safety agency may have little to no control.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
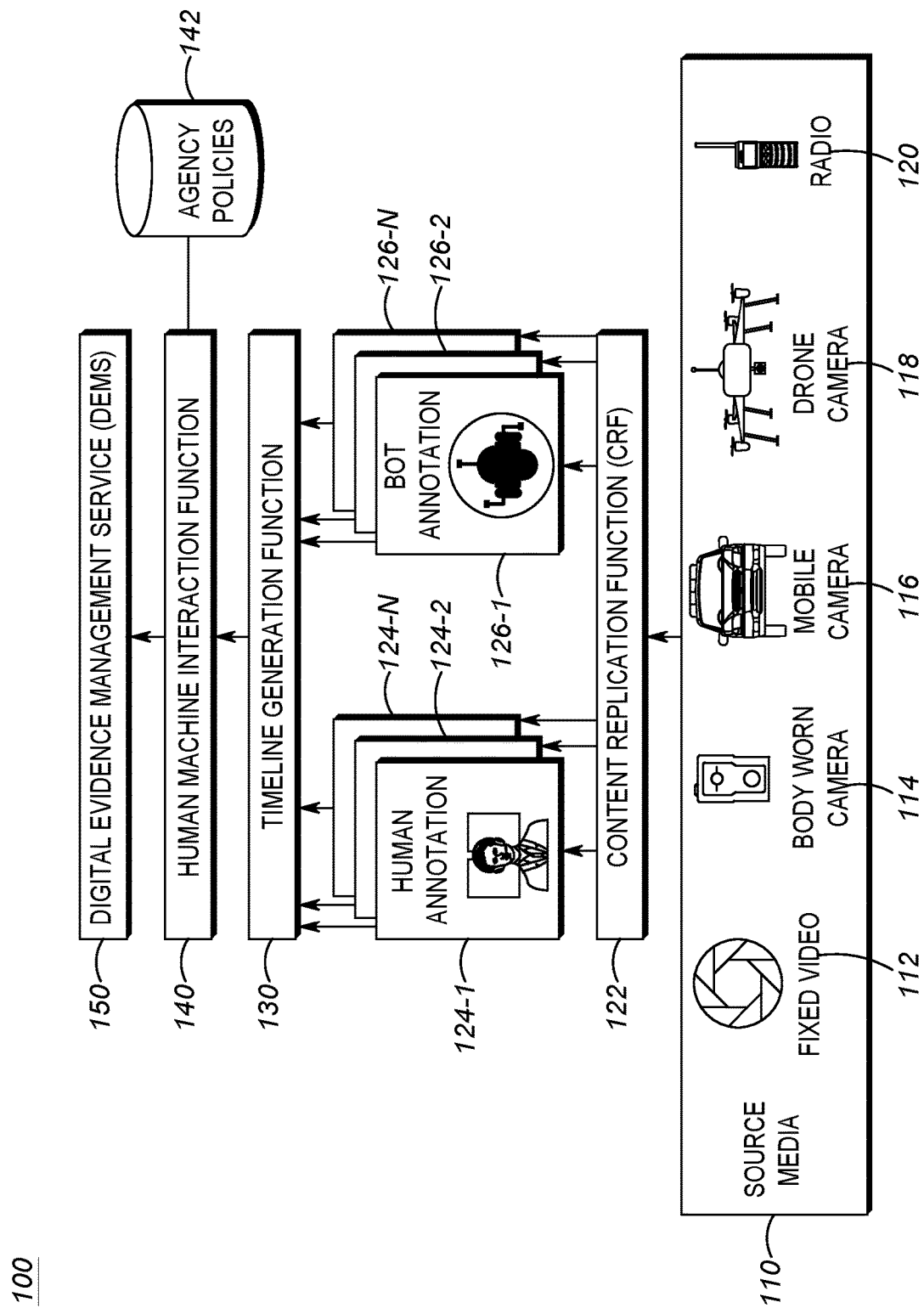
FIG. 1 is an example environment in which the techniques to support human-machine interactions for public safety annotations described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although the availability of human and machine based annotations of multimedia files has made storing and searching such files much easier, there are several problems that may result. When annotations are provided by multiple sources (e.g. human and bot, multiple bots, multiple humans, etc.) with each source likely using a different process, there may be conflicts in the annotations. For example, one annotation source may see a car that it annotates as a "black car", while another annotation source may annotate the same car as "dark blue car" due to different processes used during the creation of the annotation. In some cases, it may be difficult to identify and isolate annotations that may be in conflict.

Another problem that may arise is that the annotations may conflict with agency policy. As mentioned above, in some cases annotations may be provided as a service that is not under the direct control of an agency. An annotation service may annotate a piece of media in such a way that it violates agency policy, while still being accurate. For example, an agency may have a policy that no personally identifiable information (PII) (e.g. names, vehicle license plate numbers, etc.) may be included in an annotation. An annotation provided by a $3^{rd}$ party service may be accurate, but includes information that should not be included, per agency policy.

As yet another problem, in some cases, annotations should not be made available depending on the person viewing the media file including the annotations. For example, annotated media files may be provided to the public (e.g. the press, individual citizens, etc.). Policies may exist that say certain annotations (e.g. annotations including PII, etc.) may not be provided to external viewers, but should be made available to agency internal viewers.

The techniques described herein overcome these problems and others, individually and collectively. A mechanism is provided wherein conflicts between annotations provided by humans, bots, and any combination thereof, may be resolved using defined agency policies. The conflicts between such annotations may be visualized such that they are highlighted from non-conflicting annotations. The annotations may be reviewed to determine compliance with agency specific policies, and those annotations that do not comply may be remediated. Finally, the annotations may be redacted based on the role of the user viewing the annotation, as well as the agency policy.

Further advantages and features consistent with this disclosure will be set forth in the following detailed description, with reference to the figures.

A method is provided. Live streamed media is received. The live streamed media includes at least one of audio and video. The live streamed media is replicated. The replicated live streamed media is sent to at least two of an artificial intelligence bot and a human for annotation. A conflict between the annotations is detected. The conflict is resolved via an agency selected annotation conflict resolution policy.

In one aspect, the method further comprises visualizing the annotations on a timeline and highlighting, with a visual indication, the detected conflict. In one aspect, the method further comprises identifying an annotation that conflicts with an agency policy and at least one of correcting the identified annotation to be in compliance with the agency policy, redacting at least a portion of the identified annotation, and removing the identified annotation.

In one aspect, the method further comprises identifying a role of a user that is attempting to view an annotation, determining if the user is allowed to view the annotation based on at least one of the identified role and an agency policy, and at least partially redacting the annotation based on the determination. In one aspect, the agency selected annotation conflict resolution policy comprises at least one of an ask policy, a voting policy, an accuracy policy, a rank policy, a role policy, and a prioritized list policy.

In one aspect, the method further comprises determining that resolving the conflict using the agency selected conflict resolution policy has resulted in a further conflict, selecting a secondary agency selected conflict resolution policy, and resolving the conflict using the secondary conflict resolution policy. In one aspect, the method further comprises determining that resolving the conflict using the agency selected conflict resolution policy has resulted in a further conflict, waiting for receipt of at least one additional annotation, and resolving the conflict based on the at least one additional annotation.

A device comprising a processor and a memory coupled to the processor is provided. The memory contains a set of instructions thereon that when executed by a processor cause the processor to receive live streamed media, wherein the live streamed media includes at least one of audio and video. The instructions further cause the processor to replicate the live streamed media. The instructions further cause the processor to send the replicated live streamed media to at least two of an artificial intelligence bot and a human for annotation. The instructions further cause the processor to detect a conflict between the annotations. The instructions further cause the processor to resolve the conflict via an agency selected annotation conflict resolution policy.

In one aspect, the instructions further cause the processor to visualize the annotations on a timeline and highlight, with a visual indication, the detected conflict. In one aspect, the instructions further cause the processor to identify an annotation that conflicts with an agency policy and at least one of correct the identified annotation to be in compliance with the agency policy, redact at least a portion of the identified annotation, and remove the identified annotation.

In one aspect, the instructions further cause the processor to identify a role of a user that is attempting to view an annotation, determine if the user is allowed to view the annotation based on at least one of the identified role and an agency policy, and at least partially redact the annotation based on the determination. In one aspect the agency selected annotation conflict resolution policy comprises at least one of an ask policy, a voting policy, an accuracy policy, a rank policy, a role policy, and a prioritized list policy.

In one aspect, the instructions further cause the processor to determine that resolving the conflict using the agency selected conflict resolution policy has resulted in a further conflict, select a secondary agency selected conflict resolution policy, and resolve the conflict using the secondary conflict resolution policy. In one aspect, the instructions further cause the processor to determine that resolving the conflict using the agency selected conflict resolution policy has resulted in a further conflict, wait for receipt of at least one additional annotation, and resolve the conflict based on the at least one additional annotation.

A non-transitory processor readable medium containing a set of instructions thereon is provided. The instructions on the medium, that when executed by a processor cause the processor to receive live streamed media, wherein the live streamed media includes at least one of audio and video. The instructions on the medium further cause the processor to replicate the live streamed media. The instructions on the medium further cause the processor to send the replicated live streamed media to at least two of an artificial intelligence bot and a human for annotation. The instructions on the medium further cause the processor to detect a conflict between the annotations. The instructions on the medium further cause the processor to resolve the conflict via an agency selected annotation conflict resolution policy.

In one aspect, the instructions on the medium further cause the processor to visualize the annotations on a timeline and highlight, with a visual indication, the detected conflict. In one aspect, the instructions on the medium further cause the processor to identify an annotation that conflicts with an agency policy and at least one of correct the identified annotation to be in compliance with the agency policy, redact at least a portion of the identified annotation, and remove the identified annotation.

In one aspect, the instructions on the medium further cause the processor to identify a role of a user that is attempting to view an annotation, determine if the user is allowed to view the annotation based on at least one of the identified role and an agency policy, and at least partially redact the annotation based on the determination. In one aspect the agency selected annotation conflict resolution policy comprises at least one of an ask policy, a voting policy, an accuracy policy, a rank policy, a role policy, and a prioritized list policy.

In one aspect, the instructions on the medium further cause the processor to determine that resolving the conflict using the agency selected conflict resolution policy has resulted in a further conflict, select a secondary agency selected conflict resolution policy, and resolve the conflict using the secondary conflict resolution policy. In one aspect, the instructions on the medium further cause the processor to determine that resolving the conflict using the agency selected conflict resolution policy has resulted in a further conflict, wait for receipt of at least one additional annotation, and resolve the conflict based on the at least one additional annotation.

FIG. 1 is an example environment 100 in which the techniques to support human-machine interactions for public safety annotations described herein may be implemented. The environment may include multiple sources of media 110.

Examples of media sources could include fixed video sources 112. Fixed video sources may include cameras that are permanently fixed at a specific location. Although fixed video source cameras may be permanently fixed at a location, this does not mean their field of view (FoV) is fixed. In some cases, fixed video cameras may include pan-tilt-zoom (PTZ) functionality that allows the cameras field of view to be altered. Fixed video sources may be publically owned (e.g. traffic cameras owned by a government, etc.) or privately owned (e.g. video doorbells, private building surveillance cameras, etc.). Fixed video cameras generally may only capture video, however in some cases, audio may be captured as well.

Sources of media 110 may include public safety officer's body worn camera 114. Public safety officers in today's day and age may be equipped with body worn cameras that record both audio and video captured by the public safety officer performing day to day tasks. Another source of media may include mobile cameras 116. Mobile cameras may include cameras such as police dashboard cameras. These cameras generally capture both audio and video. Another form of mobile camera may be a device, such as a smartphone, that is capable of capturing audio and video. Drone cameras 118 may be yet another source of audio and/or video.

Although the previous examples of source media 110 generally include devices that capture video, the techniques described herein are not limited to only video capture devices. For example, source media may include a radio 120 (e.g. walkie talkie, car mounted radio, etc.) that a public safety officer may use for audio communication. Source media may include audio from fixed or mobile phones, including E911 calls. Source media may include short message service (SMS) messages, multimedia message service (MMS) messages, instant message (IM) from smartphones, etc. What should be understood is the techniques described herein are not limited to any particular type of source media or source media device, and are suitable for use with any device that produces media that is capable of being annotated.

The environment 100 may also include a content replication function 122 which may be used to replicate the content produced by the source media devices 110 and send it to one or more annotators, described below. As mentioned previously, media sources may be annotated by more than one annotator that may either be a human or a machine, such as an artificial intelligence (AI) bot.

Environment 100 may include one or more human annotators 124-1, 2 . . . N that may be humans that view the media from source media devices 110 and provide annotations that are descriptive of the media. The environment may also include one or more bot annotators 126-1, 2 . . . N. The bot annotators may be systems that perform automatic video annotation using various machine learning techniques to be able to provide a description of a media source, such as a video stream. It should be understood that the techniques described herein are not restricted to any particular type of bot annotation. The techniques described herein are suitable for use with any annotation technique, either human or machine based, that is currently available, or is developed in the future. What should be understood is that the techniques described herein operate on any annotations of media, regardless of how those annotations are produced.

The environment 100 may also include a timeline generation function 130 that may be utilized to generate a timeline of annotations as produced by the plurality of human 124 and bot 126 annotators. Annotations from the various sources may be presented using a timeline and through various techniques, described in further detail below, discrepancies between the various annotations may be highlighted.

Environment 100 may include a human machine interaction function 140 wherein the techniques described herein are implemented. An example of a device that may implement such a function is described below with respect to FIG. 10. The human-machine interaction function may receive the annotations from the human 124 and machine 126 annotators to solve the problems described above. For example, the human-machine interaction function may identify conflicts in the annotations provided by multiple annotators and, using policies stored in an agency policy 142 data store, resolve those conflicts according to agency policy.

The human machine interaction function 140 may also detect annotations that conflict with agency policy (e.g. no PII in annotations, etc.) and resolve those conflicts. The human machine interaction function may also provide a way to visualize the various annotations to highlight areas where a conflict between annotations has occurred. The human machine interaction function may also provide a way of presenting annotations to users that are customized (e.g. redacted, etc.) based on the user's particular role/permissions. The various functions provided by the human machine interaction function are described in further detail below.

Environment 100 may also include a digital evidence management service (DEMS) 150 that may store the annotations as well as any modifications to the annotations made by the human-machine interaction function 140. As mentioned previously, the techniques described herein may generally be used in a public safety/law enforcement environment. As such, the original media sources as well as the annotations may eventually become evidence that may be utilized in a court of law. The DEMS system may ensure that data related to the integrity of the media sources (e.g. chain of custody, modification history, etc.) is maintained to ensure that the media sources and annotations have not been improperly altered.

Figure 2:
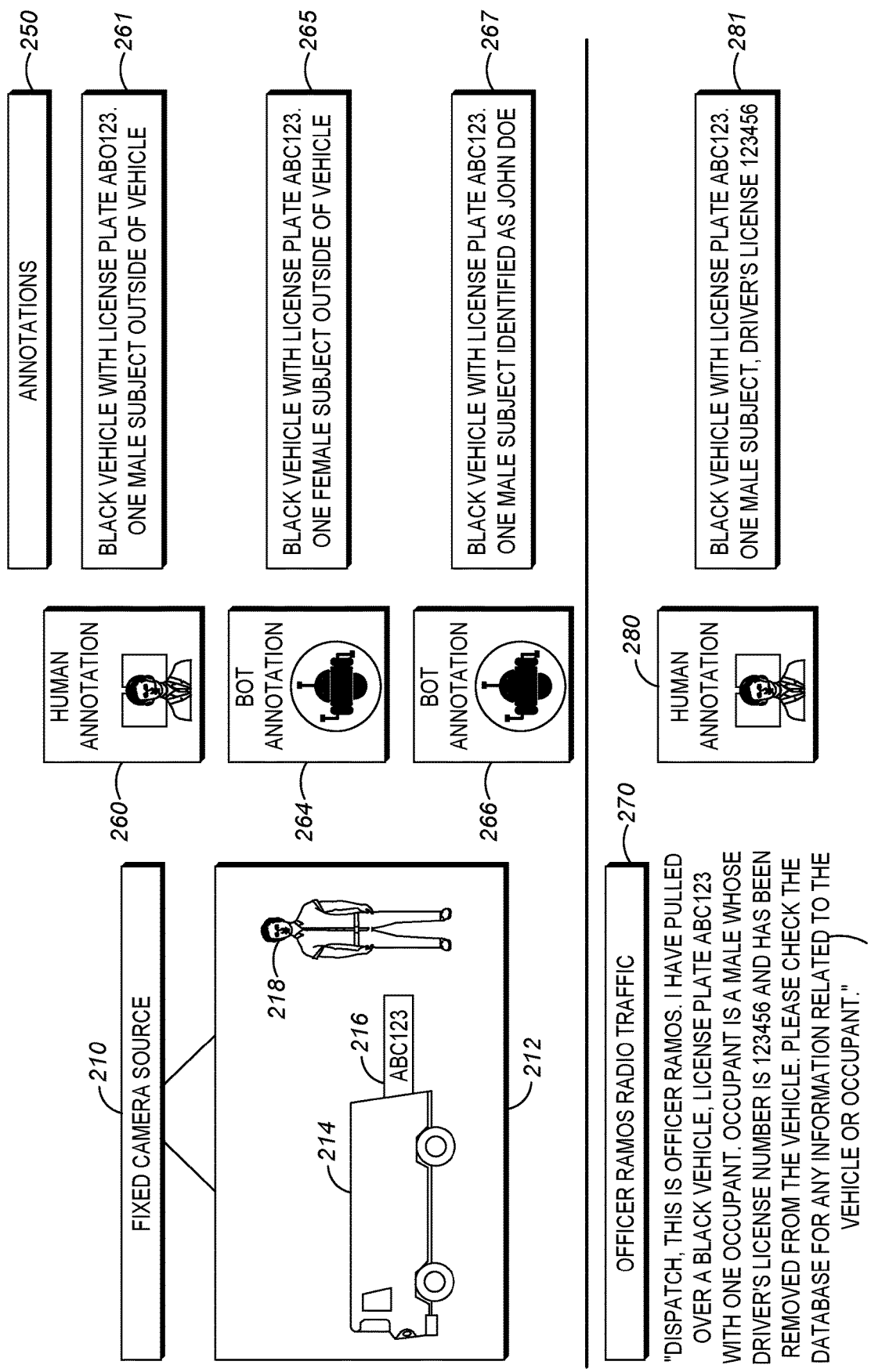
FIG. 2 is an example of annotations that may be produced by humans and bots when annotating different media sources.

FIG. 2 is an example of annotations that may be produced by humans and bots when annotating different media sources 110. As mentioned above, the techniques described herein are not dependent on any particular technique that may be utilized for annotating media. The techniques described herein assume that the media has already been annotated by a suitable human and/or AI bot. The annotations described in FIG. 2 are used to aid in the description of the human-machine interaction function, that is described in further detail below.

Fixed camera source 210 may be a source of media that captures a FoV 212. In the current example, the FoV may include a black vehicle 214 with a license plate number "ABC123" 216. The FoV may also include a human subject 218, who is identified as male. There may be three annotators that provide annotations 250.

The first annotator may be a human annotator 260 that reviews the media provided by the fixed camera source and provides annotations. In this example, the annotation 261 is "Black vehicle with license plate ABO123. One male subject outside vehicle." It should be noted that the error in the annotation of the license plate number (O instead of C) is intentional, and will be used further below to describe possible mechanisms for resolution of conflicts between different annotators.

The second annotator may be a bot annotator 264. The annotation provided may be "Black vehicle with license plate ABC123. One female subject outside vehicle." 265. The error in the sex of the subject in the annotation is intentional and is intended and will be used to describe resolution of conflicts between annotations, as will be described further below. The third annotator may also be a bot annotator 266. The annotation provided may be "Black vehicle with license plate ABC123. One male subject identified as John Doe." 267. In the case of the third annotator, the bot may be coupled to some type of identification system (e.g. facial recognition system, etc.) and may be able to provide an actual name associated with the male subject. Such PII will be described in further detail below with respect to redaction of PII.

As mentioned above, media sources are not limited to video based sources. For example, a media source cold be a public safety officer's radio. In the example, shown in FIG. 2, the media source may be Officer Ramos's radio traffic 270. As described, a public safety officer may have a radio that is used for audio communication with others, such as dispatchers. In the present example, the officer may communicate via his radio with a dispatcher as follows, "Dispatch, this is Officer Ramos. I have pulled over a black vehicle, license plate ABC123 with one occupant. Occupant is a male whose driver's license number is 123456 and has been removed from the vehicle. Please check the database for any information related to the vehicle or occupant." 272.

The audio traffic 272 may be annotated by a human annotator 280. The resulting annotation may be "Black vehicle with license plate ABC123. One male subject, driver's license 123456." 281. Although shown as a human annotator, it should be understood that the annotation may also be a simple speech to text conversion performed by a bot. What should be understood is that the annotations are not necessarily limited to annotation of a video stream.

Figure 3:
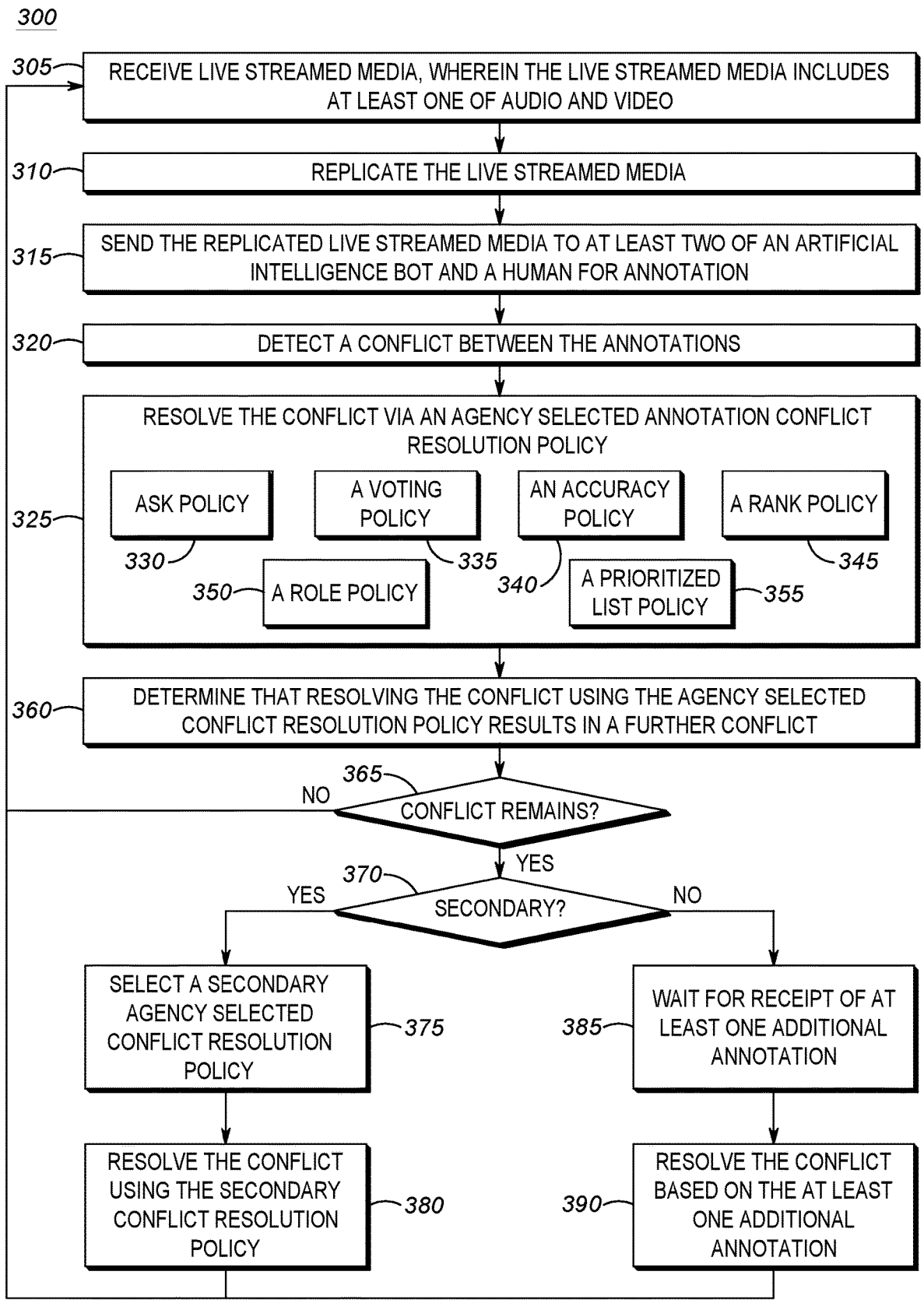
FIG. 3 is an example of a high level flow diagram for resolving conflicts in annotations in accordance with the techniques described herein.

FIG. 3 is an example of a high level flow diagram 300 for resolving conflicts in annotations in accordance with the techniques described herein. In block 305, live streamed media may be received. The live streamed media may include at least one of audio and video. As explained above, the may be many sources of media, and that media may include audio and/or video. Although the media is referred to as live streamed, this is not intended to imply that the media is received in real time. Rather, it is intended to imply that the media is streamed, as opposed to a collection of fixed images.

In block 310, the live streamed media may be replicated. As explained above, there may be more than one source of annotation, including both human annotators and bot annotators. The media stream may be replicated for each annotator. In block 315 the replicated live streamed media may be sent to at least two of an artificial intelligence bot and a human for annotation. In other words, the media stream may be sent to at least two annotators. Those two annotators may be two AI bot annotators, two human annotators, or one annotator of each type. What should be understood is that the media stream is sent to at least two annotators and those annotators may be any combination of human and AI bot annotators. More specifically, it should be understood that there is no requirement that there be at least one human and one AI bot annotator.

In block 320, it may be detected that there is a conflict in the annotations. Referring back to FIG. 2, several examples of conflicts are present. For example, in annotation 261, the license plate is listed as ABO123, while in annotations 265, 267, and 281 the license plates are listed as ABC123. As yet another example of a conflict, in annotation 261, 267, and 281 the subject is listed as male, while in annotation 265 the subject is listed as female. It should be understood that the techniques described herein are not necessarily focused on the specific techniques for determining conflicts and any technique would be suitable. For example, a simple text comparison of the annotations may determine a conflict. In other example implementations syntactic or semantic analysis of the annotations could be used to identify conflicts in annotations.

In block 325, the conflict may be resolved via an agency selected conflict resolution policy. For example, a policy stored in agency policy data store 142 may be used to determine how to resolve the conflict. Some example conflict resolution policies may include ask policy 330, voting policy 335, accuracy policy 340, rank policy 345, role policy 350, and a prioritized list policy 355. A more detailed explanation of each of these example policies is presented below with respect to FIG. 4. What should be understood is that once the conflict is identified, it may be resolved in accordance with a policy selected by an agency. Each agency may select a conflict resolution policy that is best aligned with the goals and priorities of that agency.

In block 360 it may be determined that resolving the conflict using the selected agency conflict resolution policy has resulted in another conflict. For example, if the conflict resolution policy is to use a voting scheme, but the vote results in a tie, the conflict has not been resolved. In block 365, if it is determined that there is no further conflict, the process returns to block 305. If it is determined that a conflict still remains, the process moves to block 370.

In block 370, it is determined if a secondary selection conflict resolution policy has been selected. If so, the process moves to block 375. In block 375, a secondary agency selected conflict resolution policy is selected. In other words, if the first selected conflict resolution policy does not resolve the conflict, a "second choice" conflict resolution policy is selected. In block 380, the conflict may be resolved using the secondary conflict resolution policy. The process may then return to block 305. Although not shown, it should be understood that if the secondary conflict resolution policy is unable to resolve the conflict, a third policy may be selected, and the process repeated. This selection process may continue until the conflict is able to be resolved or no further conflict resolution policies are available.

If in block 370 it is determined that a secondary policy is not going to be used, the process moves to block 385. In block 385, the system may wait for receipt of at least one additional annotation. The annotations from either human or bot annotators may not be received at the same time. For example, video streams may be processed by bots in real time, whereas human annotators may perform their annotations at some later time. If a conflict exists, the system may wait for additional annotations that may resolve the conflict. For example, annotation 261 lists the license plate as ABO123 and annotation 265 lists the license plate as ABC123, which means there is a conflict. If no other annotations have been received, the conflict remains.

In block 390, the conflict may be resolved based on the at least one additional annotation. In the present example, the annotation 267 may be received at a later time, indicating that the license plate is ABC123. Thus the conflict may be resolved as two sources list the license plate is ABC123, while only one source lists it as ABO123 (assuming a voting conflict resolution policy is being used). The process may then return to block 305. Although not shown, it should further be understood that if the receipt of the at least one additional annotation is not able to resolve the conflict, the system may return to block 385 to await receipt of another annotation that may be used to resolve the conflict.

Figure 4:
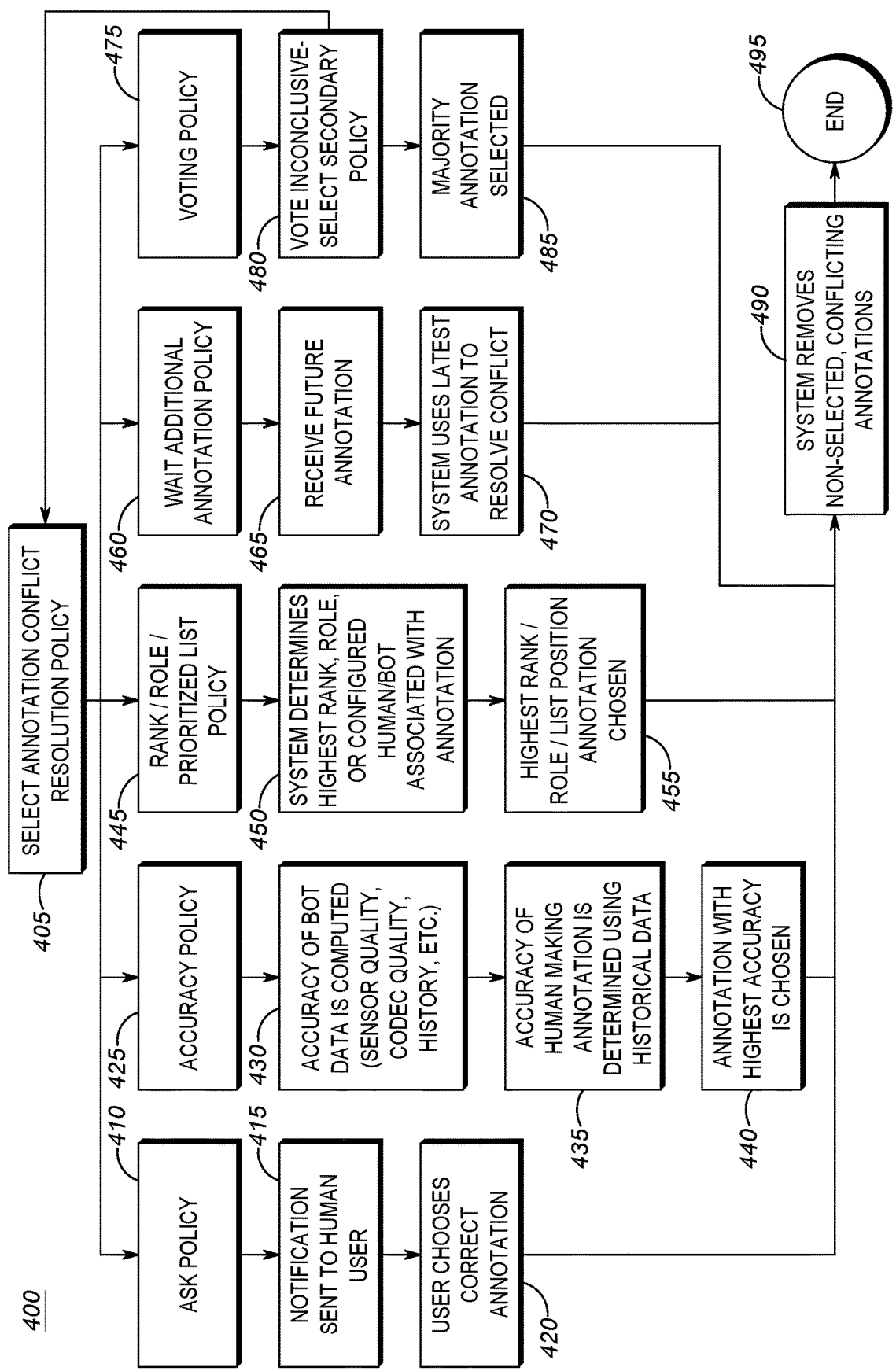
FIG. 4 is an example of a high level flow diagram illustrating implementation of several annotation conflict resolution techniques.

FIG. 4 is an example of a high level flow diagram 400 illustrating implementation of several annotation conflict resolution techniques. As described with respect to FIG. 3, an agency may select from one of several different annotation conflict resolution policies. Although FIG. 3 and FIG. 4 describe several specific types of annotation conflict resolution policies, it should be understood that these are simply examples. The techniques described may be used with the currently described examples as well as any future developed annotation conflict resolution policies. What should be understood is that the agency may select a policy that is used to resolve annotation conflicts.

In block 405, an annotation conflict resolution policy may be selected. Block 405 generally corresponds to block 325, in which an annotation conflict resolution policy is selected. Block 330 refers to an "Ask Policy" which is generally described in blocks 410-420. In block 410 an "Ask Policy" is selected. In block 415, a notification is sent to a human user that has been designated to resolve annotation conflicts. The human user is generally someone who has sufficient knowledge of the system and incident and is qualified to determine the correct annotation when presented with a plurality of annotations that are conflicting. In some cases, the human user may be the user that provided the annotation that caused the conflict. In other cases, the user may be a preconfigured user, such as a supervisor. In block 420, the human user chooses the correct annotation.

As will be described in further detail below, when a selected policy is unable to resolve an annotation conflict, a secondary policy may be chosen. In some cases, the ask policy may be considered a last option, when none of the other automated annotation conflict resolution policies are able to resolve the conflict. In the example annotations presented with respect to FIG. 2, there is a conflict in the license plate numbers between annotations 261, 265, 267, and 281. A human user, such as a supervisor, may be notified, and presented with the annotations. The human user may then select which annotation is correct.

Another annotation conflict resolution policy may be an "accuracy policy" 340. An "accuracy policy" is generally described in block 425-440. In block 425, an "accuracy policy" is selected for annotation conflict resolution. In block 430, the accuracy of bot data may be computed. The computation may involve parameters such as the sensor quality (e.g. camera resolution, etc.), a codec used (picture quality, contrast, lighting, angle of view, object size, audio volume, noise, etc.), historical accuracy (false positives, false negatives, bias score, etc.) of the bot, confidence as determined by an artificial intelligence algorithm, and any other factors that may be used to determine the accuracy of the bot. It should be understood that the accuracy may be determined for each bot that provides an annotation.

A similar accuracy of each human making an annotation may be determined in block 435. The accuracy may be based on historical data, experience level of the human, or any number of other such factors. In block 440, the annotation with the highest level of accuracy may be chosen. Continuing with the example with respect to FIG. 2, if it is determined that the bot 264 is the most accurate (e.g. is a specialized bot specifically trained to detect license plate numbers), the annotation provided by that bot may be selected.

Additional annotation conflict resolution policies may include a "rank policy" 345, a "role policy" 350, and a "prioritized list" policy 355. Each of these policies are somewhat similar and are described with respect to blocks 445-455. In a rank policy, each annotator, human and bot, may be given a rank. For example, a human shift supervisor may have the highest rank, a specialized bot may have a lesser rank, a human operator may have a still lesser rank, and a non-specialized bot may have an even lower rank. In a role policy, certain roles may be given different priorities. For example, a detective role may have a higher priority than a captain role, even though in the organization structure the captain outranks the detective. This may be due to the fact that the detective role is likely more directly involved in incidents than the captain. A bot may have a designated role (e.g. license plate detection) that has a higher priority than others, because the bot is specifically designed for detecting license plates. Finally, there may simply be prioritized list in which the various entities that provide annotations are simply rank ordered in whatever fashion is determined by the agency.

In block 445, it is determined if a rank/role/prioritized annotation conflict resolution policy is to be selected. In block 450, the system determines the highest rank/role/prioritized list annotator that has provided an annotation. In block 455, the highest ranked annotator wins, and the annotation provided by the highest ranked annotator is selected. In the example presented with respect to FIG. 2, if the human annotator 260 is determined to be the highest rank/role/prioritized list annotator, the ABO123 license plate annotation will be selected, despite the fact that the two other annotators agree, and provided a different license plate number.

Another conflict resolution policy may include a "additional annotation policy" 385, which is generally described in blocks 460-465. In some cases, annotations may be received from multiple annotators at different times. When a wait for additional annotations policy 460 is selected, the system may not be able to currently resolve an annotation conflict. For example, if two annotators disagree about a given annotation. For example, in FIG. 2, annotation 261 and annotation 265 are in conflict with respect to both the license plate number, as well as the sex of the subject. Assume that the annotation from annotator 266 has yet to be received.

When using the wait for additional annotation policy 460, the system may wait a period of time for additional annotations to arrive to determine if those later arriving annotations may be used for resolving the conflict. Assume that the annotation 267 arrives at a later time. In block 470, the later arriving annotation may be used to resolve the conflict. In this case, the correct annotation for the license plate number and the sex of the subject may be determined because two of the three annotators agree on the proper annotation for license plate and gender. It should be noted that the system may wait for a finite time to receive additional annotations. If none are received within the finite amount of time, the system may select a secondary conflict resolution policy (described in further detail below with respect to the voting policy).

Yet another type of annotation conflict resolution policy may be a "voting policy" 335. A voting policy is generally described with respect to blocks 475-485. If a voting policy is selected in block 475, as the name implies, the annotations from each annotator are compared. The annotation produced by the highest number of annotators is selected in block 485. In the example, of FIG. 2, the license plate annotation ABC123 will be selected because two 264, 266 of the three annotators 260, 264, 266 agreed that ABC123 was the correct annotation. Likewise, the sex of the subject is declared to be male because two 260,266 of the three annotators 260, 264, 266 agreed that the sex was male.

A situation may arise in which the voting policy may not be able to select the proper annotation because there may not be enough annotations to determine a majority. In the example of FIG. 2, assume there was a fourth annotator that determined the sex of the subject was female. As such there is a two-two tie. In some implementations, when the vote is inconclusive, in block 480 the system may select a secondary annotation policy. For example, the system may select any of the previously described policies, based on agency preference. The conflict resolution policy may be executed again using the secondary selected policy.

In block 490, once the system selects the correct annotation, the non-selected conflicting annotations may be removed. In some implementations, the non-selected annotations may be permanently deleted. In other implementations, the non-selected annotations may be retained, but hidden, in order to provide a complete historical record. In some implementations, the non-selected annotations may be used to determine the accuracy level of each annotator.

Figure 5:
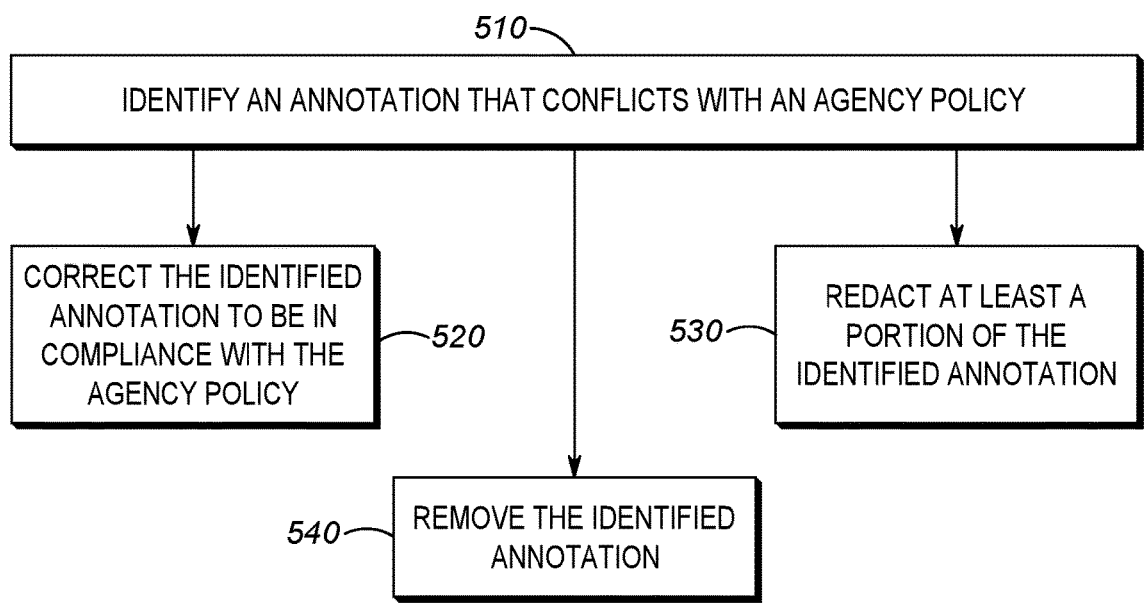
FIG. 5 is an example of a high level flow diagram for resolving conflicts in annotations related to agency policy.

FIG. 5 is an example of a high level flow diagram 500 for resolving conflicts in annotations related to agency policy. In description above with respect to FIGS. 3 and 4, the conflicts in annotations were conflicts where two or more annotations recite different things, such that the correct annotation is not apparent. There is another type of conflict with annotations that can occur when the annotation is correct, but including the annotation violates agency policy. Some examples of such violations can be the inclusion of PII within an annotation, the inclusion of other identifying information (e.g. license plate numbers, driver's license numbers, house addresses, etc.) within an annotation, the inclusion of Health Insurance Portability Accountability Act (HIPPA) information (e.g. medical information, vital signs, medical equipment readings, etc.), identifying information of people not related to the incident, offensive language, identity of minors, etc. It should be understood that these are simply examples of types of information that may be against agency policy to include in an annotation, and is not intended to be an exhaustive list.

In block 510, an annotation that conflicts with agency policy may be identified. As explained above, the annotation may be completely accurate, but its inclusion violates agency policy. The violation of agency policy may be resolved in one of several ways.

One method for resolution is shown in block 520, wherein the annotation identified is corrected to be in compliance with agency policy. For example, the annotation is corrected to remove the offending information. For example, if an annotation includes a person's first and last name, it may be corrected to delete the person's last name, thus no longer allowing the person to be identified. If the annotation includes a street address including a street and house number, the annotation may be corrected to remove the house number, thus preventing identification of the actual address.

Another method for resolution is shown in block 530, in which at least a portion of the identified annotation is redacted. The redaction may occur by replacing the offending information in the annotation with characters such as asterisks (*) or dashes (-). The offending information could be redacted by replacing the information with the actual word "redacted" which would allow a viewer to know that there was information present, but it was a violation of agency policy to display such information. In some implementations, the un-redacted annotation is still stored, and can be accessed by a user with authority to override agency policy.

Yet another form for resolution is shown in block 540, wherein the identified annotation is simply removed. In such a case, the user has no idea that there was information included that has been removed, because there is no indication that anything was modified. As above, the unmodified original annotation, which includes information that is against agency policy, may still be maintained. Such information may still be accessed by users with sufficient authority to view annotations that are not in compliance with agency policy.

It should furthermore be understood that annotations that need to be redacted can come from either human or bot annotators. In the case of a human annotator, the human may have simply made a mistake or might have been unaware of the agency policy. In some implementations, human annotator may be monitored to determine how many annotations required some form of remediation. If the number exceeds a threshold, this may indicate the human annotator is in need of additional training.

As mentioned above, in some cases, the bot providing annotation may be provided by a third party and/or cloud based solution. In such cases, the agency may have little to no control over how the bot operates. In other implementations, the third party bot annotator may be trained based on the remediated annotations such that the third party bot becomes aware of the agencies policy. As will be explained further below, when displaying annotations on a timeline, annotations that were remediated may be highlighted with an icon, a separate color, flashing, etc. in order to point out the fact that the annotation was modified in some way.

Figure 6:
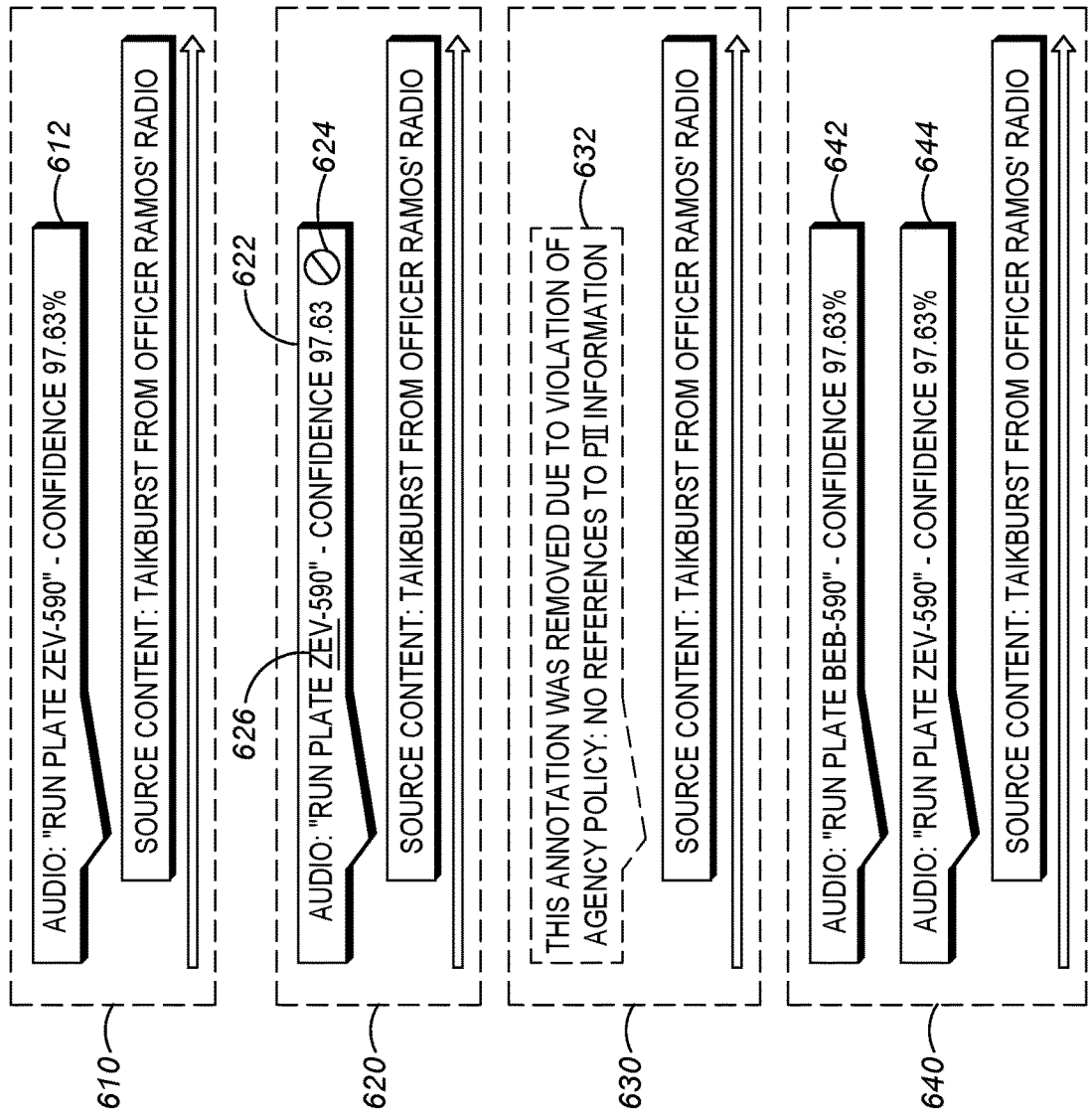
FIG. 6 is an example of some of the ways conflicts in annotations may be visualized on a timeline.

FIG. 6 is an example of some of the ways conflicts in annotations may be visualized on a timeline. It may be useful to review annotations of a media source in a visual, timeline based format. For example, the annotations for a source may be depicted alongside a playback of the source in a media player. As the player plays the media, the annotations may be provided. However, as explained above, the annotations for any particular piece of media may have originally been incorrect/against agency policy/etc. and may have been corrected. It may be useful for the reviewer to understand that the annotation being shown is not necessarily what was originally annotated, as it may have been corrected.

FIG. 6 depicts several different ways the conflicts in annotations can be highlighted. In each of the timelines shown, assume that the media player is playing, and a progress bar is moving from left to right, as indicated by the broad arrow. When the point in the media is reached that corresponds to the annotation, the annotation may be displayed. The display may be modified to alert the reviewer that the annotation was altered.

In timeline 610, the altered annotation 612 may be highlighted by giving the annotation a different background color, a different text color, a different font, flashing, different font type (e.g. bold, italics, size, underline, outline, etc.). In timeline 620, the altered annotation 622 may be highlighted by including an icon 624 that indicates that this annotation has been altered. In addition, the particular parts of the annotation that were altered may be identified. In the example shown, the first portion of the license plate "ZEV"

626 is shown as underlined, as this is the portion of the annotation that has been altered. It should be understood that underlining to point out the alteration is only one possible action. Any of the techniques previously presented (colors, flashing, font, etc.) could also be used.

In timeline 630, the annotation could simply be replaced with an annotation 632, which notifies the user that the annotation includes information that cannot be displayed due to agency policy. In the present example, the annotation states that the original was removed because it included PII (e.g. license plate number), and such inclusion is against agency policy. As mentioned above, in some implementations the original annotation is preserved, and users with sufficient privilege levels may be able to view the original annotation.

In timeline 640 every annotation from each annotator (human or bot) that is conflicting may be shown to the user. For example, in the example timeline, one annotation says the license plate number was "BEB" while the other says it was "ZEV" and both of these annotations may be provided to the reviewer. The reviewer may then make their own decisions as to which annotation is correct. In some implementations, the user may select the correct annotation. This would generally be in compliance with the "Ask Policy" described above, and could be executed via the visual timeline interface.

Figure 7:
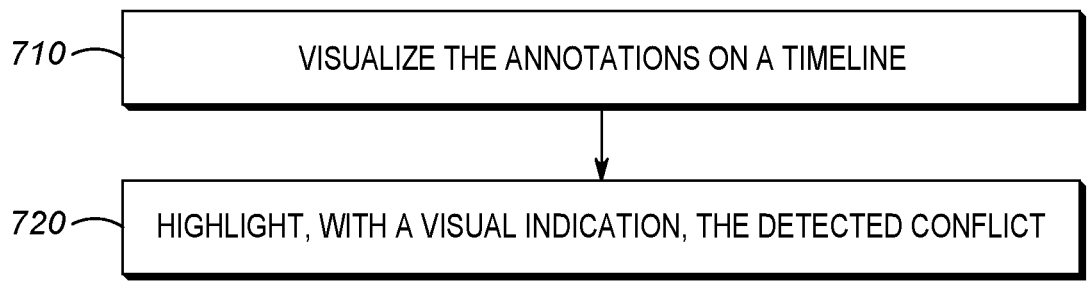
FIG. 7 is an example of a high level flow diagram for presenting conflicts in annotations on a timeline.

FIG. 7 is an example of a high level flow diagram 700 for presenting conflicts in annotations on a timeline. In block 710, the annotations may be visualized on a timeline. As explained above, the timeline may be associated with a media player, and as the media is being played, the annotations may be visually presented in the correct time sequence of the playback of the media.

In block 720, a visual indication may be used to highlight the detected conflicts. This way the reviewer is made aware that the annotation being viewed had a conflict that was resolved using the agency specific policy. In some cases, the actual agency policy that caused the conflict may be presented as well. In yet other implementations, all annotations may be presented simultaneously to the reviewer.

Figure 8:
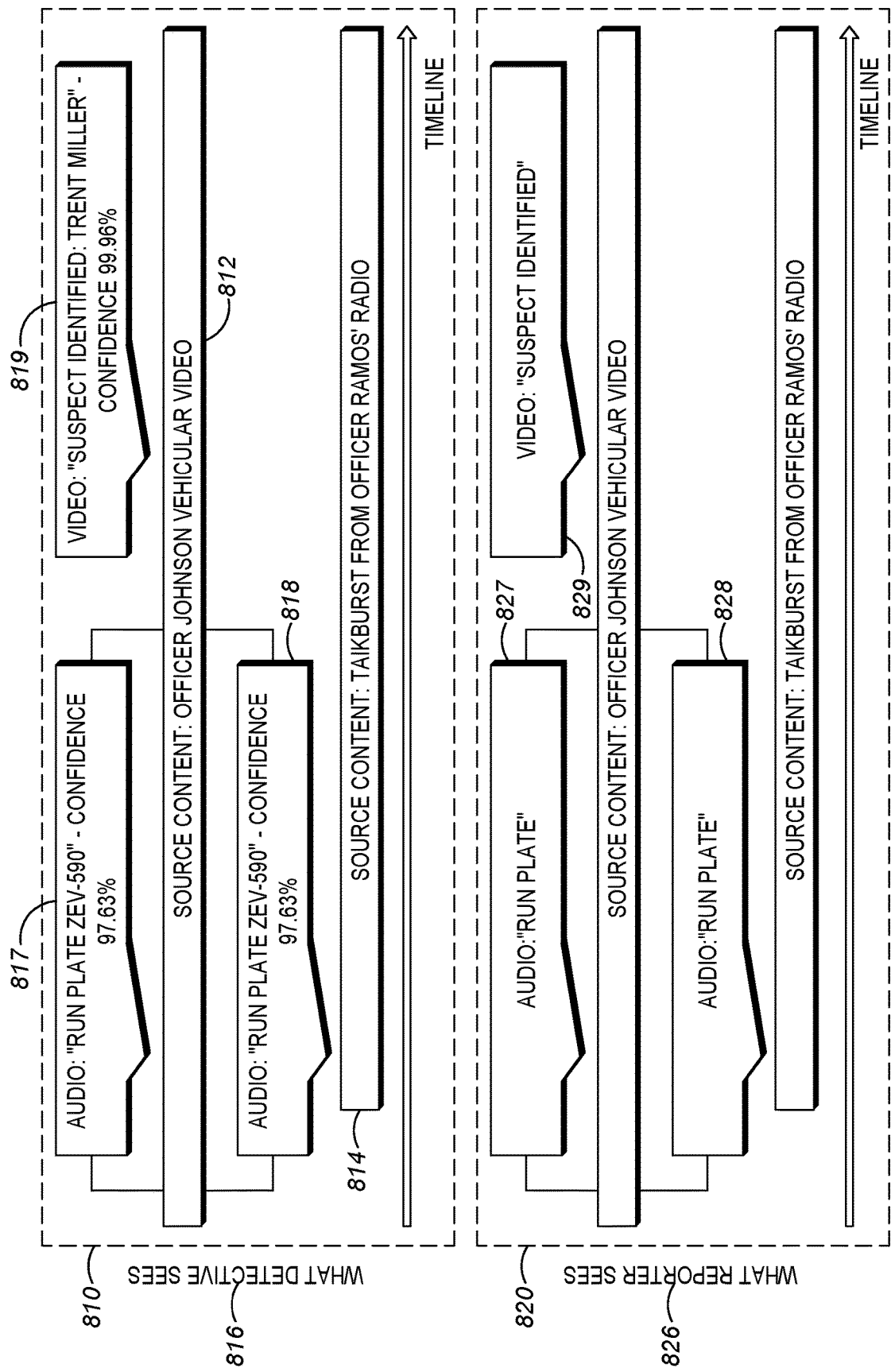
FIG. 8 is an example of redaction of annotations presented in a timeline based on the person who is looking at the annotations.

FIG. 8 is an example of redaction of annotations presented in a timeline based on the role of the person who is looking at the annotations. Timeline 810 depicts a timeline with annotations from two sources, vehicular video 812 and a talkburst from a radio 814. Timeline 810 is being viewed by a person who has a role of detective 816. For purposes of this description, assume that the detective role is not restricted, and is allowed to view all annotations, in full, without redaction.

As shown, in annotations 817 and 818, the detective viewing the timeline is able to see the un-redacted annotations, that include identifying information, such as license plate numbers. In addition, in annotation 819, the detective is able to view the suspect's name, which is clearly PII, in the annotation.

Timeline 820 may be what is presented to a person who has the role of a member of the public, such as a reporter 826, may see. The timeline still includes all of the same annotations 827, 828, 829 (similar to annotations 817, 818, and 818) that were in timeline 816. However, assume that agency policy does not permit a person in the role of reporter to view certain information. For example, identifying information such as license plate numbers may need to be redacted for a person in the role of reporter. As such, in annotations 827 and 828, the license plate number is simply removed. Likewise, in annotation 829, the suspect's name, which is PII may be removed if it is against agency policy for a reporter to be given such information.

Figure 9:
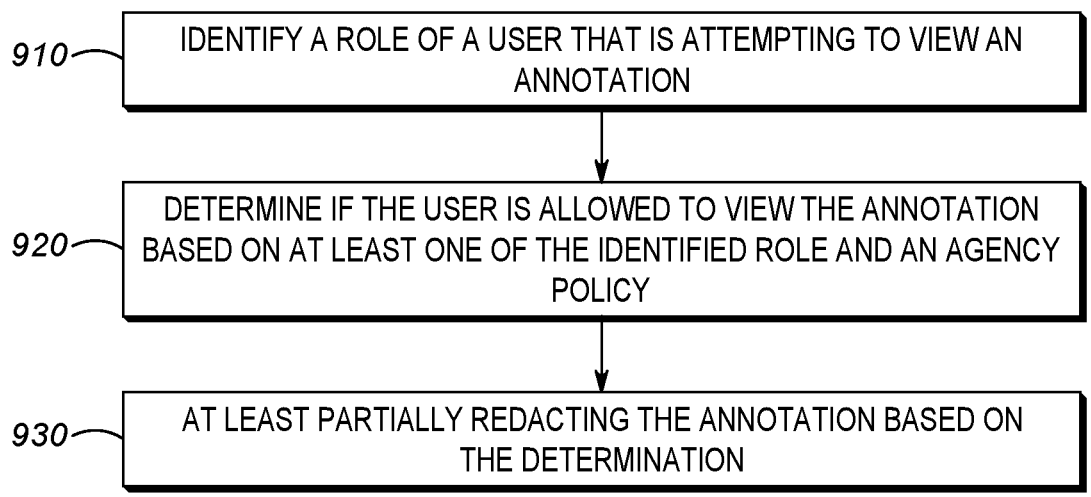
FIG. 9 is an example of a high level flow diagram for redaction of annotations presented in a timeline based on the person who is looking at the annotations.

FIG. 9 is an example of a high level flow diagram 900 for redaction of annotations presented in a timeline based on the person who is looking at the annotations. In block 910, the role of a user that is attempting to view an annotation is identified. As mentioned above, every person with access to the annotations may not have the same levels of permission to view all annotations. Once a person who is attempting to view the annotations role has been identified, the role may be used to determine which annotations are presented.

In block 920, it may be determined if the user is allowed to view the annotation based on at least one of the identified role and agency policy, or a combination of both. As explained above, in some cases agency policy may state that the annotation should not be visible by anyone (e.g. PII, etc.) regardless of role. In other cases, a role (e.g. chief of police, etc.) may be allowed to view all annotations. In other cases, agency policy may state that certain roles (e.g. media, general public, etc.) should only be allowed to see specified types of annotations.

In block 930, the annotation may be at least partially redacted based on the determination. As explained above, the redaction may include completely backing out the data, modifying the data, or completely removing the annotation. The redaction based on role is generally similar to the redactions based on agency policy described with respect to FIG. 5, with the exception that the redaction is dependent on the specific reviewer's role.

Figure 10:
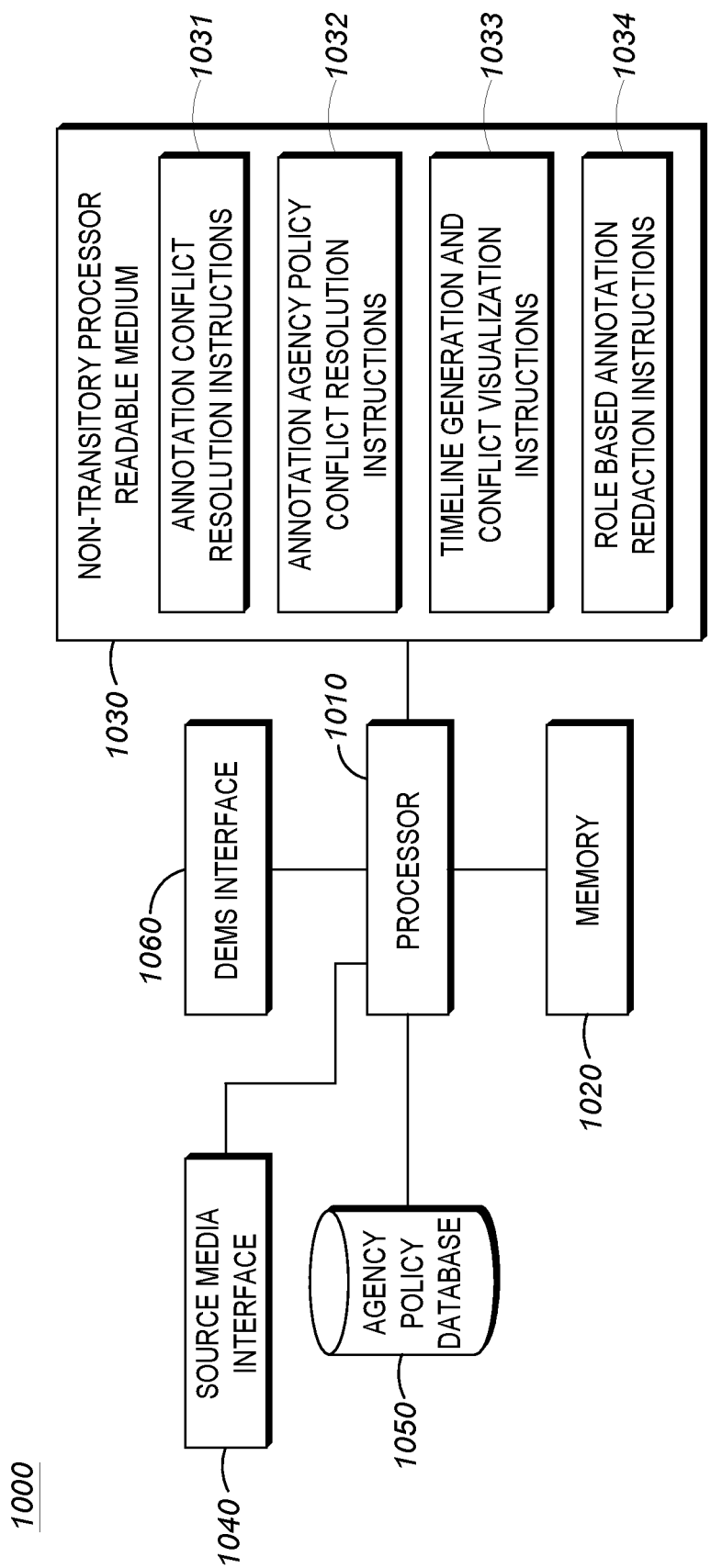
FIG. 10 is an example of a device that may implement the support human-machine interactions for public safety annotations techniques described herein.

FIG. 10 is an example of a device that may implement the support human-machine interactions for public safety annotations techniques described herein. It should be understood that FIG. 10 represents one example implementation of a computing device that utilizes the techniques described herein. Although only a single processor is shown, it would be readily understood that a person of skill in the art would recognize that distributed implementations are also possible. For example, the various pieces of functionality described above (e.g. annotation conflict resolution, redaction, etc.) could be implemented on multiple devices that are communicatively coupled. FIG. 10 is not intended to imply that all the functionality described above must be implemented on a single device.

Device 1000 may include processor 1010, memory 1020, non-transitory processor readable medium 1030, source media interface 1040, agency policy database 1050, and DEMS interface 1060.

Processor 1010 may be coupled to memory 1020. Memory 1020 may store a set of instructions that when executed by processor 1010 cause processor 1010 to implement the techniques described herein. Processor 1010 may cause memory 1020 to load a set of processor executable instructions from non-transitory processor readable medium 1030. Non-transitory processor readable medium 1030 may contain a set of instructions thereon that when executed by processor 1010 cause the processor to implement the various techniques described herein.

For example, medium 1030 may include annotation conflict resolution instructions 1031. The annotation conflict resolution instructions 1031 may cause the processor to receive media annotations using the source media interface 1040. The source media interface may allow the process to receive media that has been annotated by either human annotators, bot annotators, or any combination of either type of annotators. The annotation conflict resolution instructions 1031 may cause the processor to access agency policy database 1050 to retrieve agency policies with respect to resolving conflicts in annotations and then using those policies, resolve any conflicts in the annotations. The annotation conflict resolution instructions 1031 are described generally throughout the specification, including the description of blocks 305-390 and 405-495.

The medium 1030 may include annotation agency policy conflict resolution instructions 1032. The annotation agency policy conflict resolution instructions 1032 may include instructions that cause the processor to resolve conflicts with agency policy of a specific annotation (as opposed to conflicts between annotations. Again, the processor may access the agency policy database 1050 to retrieve those agency policies and apply them to annotations. The annotation agency policy conflict resolution instructions 1032 are described generally throughout the specification, including the description of blocks 510-540.

The medium 1030 may include timeline generation and conflict visualization instructions 1033. The timeline generation and conflict visualization instructions 1033 may cause the processor to display the annotations on a timeline in order to visualize where the annotations occur in the timeline of the media. The visualization may also depict where in the timeline annotations were modified to resolve conflicts. he timeline generation and conflict visualization instructions 1033 are described generally throughout the specification, including the description of blocks 710 and 720.

The medium 1030 may include role based annotation redaction instructions 1034. The role based annotation redaction instructions 1034 may cause the processor to determine the role of a person viewing the annotations and redact the annotations based on that role. The role based annotation redaction instructions 1034 are described generally throughout the specification, including the description of blocks 910-930.

The source media files, as well as any of the annotations wherein conflicts have been resolved may be stored in a DEMS system by the processor. For example, the processor may use the DEMS interface 1060 to store the results in the DEMS system.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot replicate electronic media for forwarding to either human or machine annotators, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving live streamed media, wherein the live streamed media includes at least one of audio and video;
replicating the live streamed media;
sending the replicated live streamed media to at least two of an artificial intelligence bot and a human for annotation;
detecting a conflict between the annotations; and
resolving the conflict via an agency selected annotation conflict resolution policy.

2. The method of claim 1 further comprising:
visualizing the annotations on a timeline; and
highlighting, with a visual indication, the detected conflict.

3. The method of claim 1 further comprising:
identifying an annotation that conflicts with an agency policy; and
at least one of correcting the identified annotation to be in compliance with the agency policy, redacting at least a portion of the identified annotation, and removing the identified annotation.

4. The method of claim 1 further comprising:
identifying a role of a user that is attempting to view an annotation;
determining if the user is allowed to view the annotation based on at least one of the identified role and an agency policy; and
at least partially redacting the annotation based on the determination.

5. The method of claim 1 wherein the agency selected annotation conflict resolution policy comprises at least one of an ask policy, a voting policy, an accuracy policy, a rank policy, a role policy, and a prioritized list policy.

6. The method of claim 5 further comprising:
  determining that resolving the conflict using the agency selected conflict resolution policy has resulted in a further conflict;
  selecting a secondary agency selected conflict resolution policy; and
  resolving the conflict using the secondary conflict resolution policy.

7. The method of claim 5 further comprising:
  determining that resolving the conflict using the agency selected conflict resolution policy has resulted in a further conflict;
  waiting for receipt of at least one additional annotation; and
  resolving the conflict based on the at least one additional annotation.

8. A device comprising:
  a processor; and
  a memory coupled to the processor, the memory containing a set of instructions thereon that when executed by a processor cause the processor to:
    receive live streamed media, wherein the live streamed media includes at least one of audio and video;
    replicate the live streamed media;
    send the replicated live streamed media to at least two of an artificial intelligence bot and a human for annotation;
    detect a conflict between the annotations; and
    resolve the conflict via an agency selected annotation conflict resolution policy.

9. The device of claim 8 wherein the memory further comprises instructions to:
  visualize the annotations on a timeline; and
  highlight, with a visual indication, the detected conflict.

10. The device of claim 8 wherein the memory further comprises instructions to:
  identify an annotation that conflicts with an agency policy; and
  at least one of correct the identified annotation to be in compliance with the agency policy, redact at least a portion of the identified annotation, and remove the identified annotation.

11. The device of claim 8 wherein the memory further comprises instructions to:
  identify a role of a user that is attempting to view an annotation;
  determine if the user is allowed to view the annotation based on at least one of the identified role and an agency policy; and
  at least partially redact the annotation based on the determination.

12. The device of claim 8 wherein the agency selected annotation conflict resolution policy comprises at least one of an ask policy, a voting policy, an accuracy policy, a rank policy, a role policy, and a prioritized list policy.

13. The device of claim 12 wherein the memory further comprises instructions to:
  determine that resolving the conflict using the agency selected conflict resolution policy has resulted in a further conflict;
  select a secondary agency selected conflict resolution policy; and
  resolve the conflict using the secondary conflict resolution policy.

14. The device of claim 12 wherein the memory further comprises instructions to:
  determine that resolving the conflict using the agency selected conflict resolution policy has resulted in a further conflict;
  wait for receipt of at least one additional annotation; and
  resolve the conflict based on the at least one additional annotation.

15. A non-transitory processor readable medium containing a set of instructions thereon that when executed by a processor cause the processor to:
  receive live streamed media, wherein the live streamed media includes at least one of audio and video;
  replicate the live streamed media;
  send the replicated live streamed media to at least two of an artificial intelligence bot and a human for annotation;
  detect a conflict between the annotations; and
  resolve the conflict via an agency selected annotation conflict resolution policy.

16. The non-transitory processor readable medium of claim 15 further comprising instructions to:
  visualize the annotations on a timeline; and
  highlight, with a visual indication, the detected conflict.

17. The non-transitory processor readable medium of claim 15 further comprising instructions to:
  identify an annotation that conflicts with an agency policy; and
  at least one of correct the identified annotation to be in compliance with the agency policy, redact at least a portion of the identified annotation, and remove the identified annotation.

18. The non-transitory processor readable medium of claim 15 further comprising instructions to:
  identify a role of a user that is attempting to view an annotation;
  determine if the user is allowed to view the annotation based on at least one of the identified role and an agency policy; and
  at least partially redact the annotation based on the determination.

19. The non-transitory processor readable medium of claim 15 wherein the agency selected annotation conflict resolution policy comprises at least one of an ask policy, a voting policy, an accuracy policy, a rank policy, a role policy, and a prioritized list policy.

20. The non-transitory processor readable medium of claim 19 further comprising instructions to:
  determine that resolving the conflict using the agency selected conflict resolution policy has resulted in a further conflict;
  select a secondary agency selected conflict resolution policy; and
  resolve the conflict using the secondary conflict resolution policy.

21. The non-transitory processor readable medium of claim 19 further comprising instructions to:
  determine that resolving the conflict using the agency selected conflict resolution policy has resulted in a further conflict;
  wait for receipt of at least one additional annotation; and
  resolve the conflict based on the at least one additional annotation.

* * * * *